Patented May 15, 1923.

1,455,544

UNITED STATES PATENT OFFICE.

LOUIS MINTON, OF MANCHESTER, ENGLAND.

RUBBER OR RUBBER-COATED ARTICLE.

No Drawing.   Application filed August 26, 1921.   Serial No. 495,847.

*To all whom it may concern:*

Be it known that I, LOUIS MINTON, a subject of the King of Great Britain and Ireland, residing at Manchester, England, have invented new and useful Improvements in or Relating to Rubber or Rubber-Coated Articles, of which the following is a specification.

This invention relates to articles made of rubber, or coated with rubber, and has for its object to provide said articles with a lustrous finish, resembling silk, said finish being insoluble in water, does not crack and is unaffected by heat, acid or grease.

According to the invention, powdered mica is applied to the rubber while in an adhesive or plastic condition and prior to vulcanization or immediately after, said mica being in its natural state, or dyed to any colour. The rubber may be such as is used on fabrics or rubber produced by moulding, extruding (spewing) or pressing, calendering, building up, coating (enamelling) or dipping.

In carrying out the invention as applied to rubber-coated fabrics, a powdered mica is applied to the rubber while the latter is in a plastic or adhesive condition, and before or immediately after vulcanization, the mica being dusted on to the surface of the rubber after being applied to the fabric or incorporated with the rubber during mastication and before it is applied to the fabric.

The mica-coated surface in whole or in part and either before or after vulcanization may be printed, embossed or schrienered to produce the appearance of woven or other desired patterns.

Instead of applying the powdered mica directly to the rubber, it may be applied through the medium of a mixture of rubber in solution, resin or oil thickening, said mixture being applied by printing it on the rubber of the fabric before or after vulcanization.

In applying the invention to moulded rubber goods, a coating or lining of plastic or adhesive solution, such as india-rubber solution or petroleum jelly, is applied to the inner faces of the mould and such coating or lining is then dusted with powdered mica. On vulcanization taking place the mica becomes part of the surface of the moulded article, and affords the desired lustrous finish. In lieu of dusting the mica on the coating or lining of adhesive solution, it may be mixed with the solution prior to the latter being applied to the mould.

In applying the invention to pressed sheet rubber, the plates coming into contact with the rubber are first coated with powdered mica (or an adhesive solution containing powdered mica), and the vulcanization then partly effected to produce flat smooth surfaces, after which the plates are recoated with powdered mica and the vulcanization completed.

In carrying out the invention as applied to built-up, extruded, coated or dipped rubber goods, such goods prior to vulcanization are immersed in or completely covered over with powdered mica.

Instead of applying the mica prior to vulcanization, it may be applied immediately after vulcanization, i. e., while the rubber is still in a setting condition.

I have found by experiments that mica has no detrimental effect upon rubber, and as it is an insoluble body it is more durable than starch or farinaceous materials usually employed for finishing, which are soluble and cause the rubber surface to become sticky and dirty in wear.

Powdered mica readily associates itself with rubber and transmits its properties to same; as examples, acid-resisting, insulating, heat-resisting, lubricating, sterilizing.

What I claim is:—

1. In the manufacture of moulded rubber goods applying an adhesive coating to the inner faces of the moulds, with which is incorporated, by dusting powdered mica, and afterwards moulding the rubber and vulcanizing same, substantially as herein set forth.

2. In the manufacture of press-sheet rubber, dusting or covering the plates with powdered mica, then pressing and partly vulcanizing the rubber, then recoating the plates with powdered mica and again pressing the rubber and completing the vulcanization, substantially as herein set forth.

In testimony whereof I have signed my name to this specification.

LOUIS MINTON.